United States Patent [19]
Kyrtsos

[11] Patent Number: 5,390,124
[45] Date of Patent: Feb. 14, 1995

[54] METHOD AND APPARATUS FOR IMPROVING THE ACCURACY OF POSITION ESTIMATES IN A SATELLITE BASED NAVIGATION SYSTEM

[75] Inventor: Christos T. Kyrtsos, Peoria, Ill.

[73] Assignee: Caterpillar Inc., Peoria, Ill.

[21] Appl. No.: 984,313

[22] Filed: Dec. 1, 1992

[51] Int. Cl.$^6$ ............................................. G06F 15/50
[52] U.S. Cl. .................... 364/449; 364/459; 342/357; 342/358; 342/457
[58] Field of Search ............... 364/443, 449, 455, 454, 364/459; 73/178 R; 342/357, 358, 450, 451, 457, 463, 465

[56] References Cited

U.S. PATENT DOCUMENTS

| | | | |
|---|---|---|---|
| 4,667,203 | 5/1987 | Counselman, III | 342/357 |
| 4,751,512 | 6/1988 | Longaker | 342/357 |
| 4,870,422 | 9/1989 | Counselman, III | 342/357 |
| 4,894,662 | 1/1990 | Counselman | 364/459 |
| 4,912,475 | 3/1990 | Counselman, III | 342/357 |
| 5,119,102 | 6/1992 | Barnard | 342/357 |
| 5,148,179 | 9/1992 | Allison | 364/449 |
| 5,155,490 | 10/1992 | Spradley, Jr. et al. | 342/357 |

OTHER PUBLICATIONS

"Compensating for GPS Ephemeris Error", *NASA Tech Briefs*, Nov. 1992, pp. 56 and 58.

*Primary Examiner*—Gary Chin
*Attorney, Agent, or Firm*—Stern, Kessler, Goldstein & Fox

[57] ABSTRACT

The accuracy of a vehicle position estimate generated using a satellite-based navigation system is improved by accounting for non-linear errors in the vehicle position computations. The standard navigation equation is modified to include the error coefficients $\alpha$, $\beta$, $\gamma$ and $\delta$. $\alpha$ is used to model errors in the x dimension. $\beta$ is used to model errors in the y dimension. $\gamma$ is used to model errors in the z dimension. $\delta$ is used to model errors in the pseudoranges. The error coefficients may be computed using an open-ended GPS system or a differential GPS system. The error coefficients may be computed in real time or may be computed once and used for a period thereafter. Once computed, the error coefficients are factored into the computation of a vehicle position estimate for increased precision.

12 Claims, 9 Drawing Sheets

METHOD AND APPARATUS FOR IMPROVING THE ACCURACY OF POSITION ESTIMATES IN A SATELLITE BASED NAVIGATION SYSTEM

FIELD OF THE INVENTION

This invention relates generally to the field of navigation systems which use a constellation of Earth-orbiting satellites to determine the position of a receiver at or near the Earth's surface. More specifically, the invention relates to a method and apparatus for improving the accuracy of position estimates in such a satellite based navigation system.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares. The satellite orbits will be neither polar nor equatorial but will lie in mutually orthogonal inclined planes.

Each GPS satellite will orbit the Earth approximately once every 12 hours. This coupled with the fact that the Earth rotates on its axis once every twenty-four hours causes each satellite to complete exactly two orbits while the Earth turns one revolution.

The position of each satellite at any given time will be precisely known and will be continuously transmitted to the Earth. This position information, which indicates the position of the satellite in space with respect to time (GPS time), is known as ephemeris data.

In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver.

The range is called a "pseudorange" because the receiver clock may not be precisely synchronized to GPS time and because propagation through the atmosphere introduces delays into the navigation signal propagation times. These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above. If the receiver's clock were precisely synchronized with that of the GPS satellites, then this fourth satellite would not be necessary. However, precise (e.g., atomic) clocks are expensive and are, therefore, not suitable for all applications.

For a more detailed discussion on the NAVSTAR GPS, see Parkinson, Bradford W. and Gilbert, Stephen W., "NAVSTAR: Global Positioning System—Ten Years Later," Proceedings of the IEEE, Vol. 71, No. 10, October 1983; and GPS: A Guide to the Next Utility, published by Trimble Navigation Ltd., Sunnyvale, Calif., 1989, pp. 1–47, both of which are incorporated herein by reference. For a detailed discussion of a vehicle positioning/navigation system which uses the NAVSTAR GPS, see commonly owned U.S. pat. appl. Ser. No. 07/628,560, entitled "Vehicle Position Determination System and Method," filed Dec. 3, 1990, which is incorporated herein by reference.

In the NAVSTAR GPS, the electromagnetic signals from each satellite are continuously transmitted using a single carrier frequency. Each satellite, however, uses a different modulation gold code to allow differentiation of the signals. The carrier frequency is modulated using a pseudorandom signal which is unique to each GPS satellite. Consequently, the orbiting GPS satellites can be identified when the navigation signals are demodulated.

Furthermore, the NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The C/A signal is a gold code sequence having a chip rate of 1.023 MHz. Gold code sequences are known in the art.

A chip is one individual pulse of the pseudorandom code. The chip rate of a pseudorandom code sequence is the rate at which the chips in the sequence are generated. Consequently, the chip rate is equal to the code repetition rate divided by the number of members in the code. With respect to the C/A mode of the NAVSTAR GPS, there exists 1,023 chips in each gold code sequence and the sequence is repeated once every millisecond. Use of the 1.023 MHz gold code sequence from four orbiting GPS satellites enables the terrestrial position of an Earth receiver to be determined to an approximate accuracy of within 60 to 100 meters (with 95% confidence).

The second mode of modulation in the NAVSTAR GPS is commonly referred to as the "precise" or "protected" (P) mode. In the P-mode, the pseudorandom code has a chip rate of 10.23 MHz. Moreover, the P-mode sequences are extremely long, so that the sequences repeat no more than once every 267 days. As a result, the terrestrial position of any Earth receiver can be determined to within an approximate accuracy of 16 meters (spherical error probable). The P-mode is also known as the "Precise Positioning Service".

The P-mode sequences are held in secrecy by the United States government and are not made publicly available. The P-mode is intended for use only by Earth receivers specifically authorized by the United States government. Thus, the P-mode modulated data is generally not available so that many GPS users must rely solely on the GPS data provided via the C/A mode of modulation. This relegates most users to a less accurate positioning system.

The clock and atmospheric errors discussed above add to the inaccuracy of the positioning system. Other errors which affect GPS position computations include receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system.

Methods are available for compensating or correcting for many of these errors. However, atmospheric errors and satellite path shifting have non-linear components. These errors account for a ±2 meter limitation on positioning precision.

A conventional method which attempts to compensate for these non-linear errors uses a differential system (discussed below) to produce a linear bias for each pseudorange (i.e., a bias is calculated for each satellite). A base station, having a fixed, known position, computes a pseudorange to each satellite. The base station further computes a distance between its known position and the position of each satellite (computed from the ephemeris data). By comparing the pseudorange to each computed distance, a pseudorange bias can be computed for each satellite. The pseudorange bias for each satellite can then be transmitted to the vehicle for use in the position estimate computations.

This method, however, does not account for the non-linear nature of the errors. For example, if ephemeris data indicates that a satellite is at a position $P_1$ and the satellite is actually at a position $P_2$ (e.g., due to wobble), then a single linear bias which modifies the pseudorange cannot completely correct for the wobble.

Accordingly, what is needed is a method to correct for these non-linear errors so that the precision of vehicle position estimates may be improved.

SUMMARY OF THE INVENTION

The invention is an apparatus and method for use with a satellite based navigation system. The accuracy, of vehicle position estimates is improved by accounting for non-linear errors in the vehicle position computations. The standard navigation equation is modified to include the error coefficients $\alpha$, $\beta$, $\gamma$ and $\delta$. $\alpha$ is used to model errors in the x dimension. $\beta$ is used to model errors in the y dimension. $\delta$ is used to model errors in the z dimension. $\delta$ is used to model a mean error in the pseudoranges.

Because the error sources (which are being modeled using $\alpha$, $\beta$, $\gamma$, $\delta$) are random in nature, each will have a zero mean and will be unpredictable over time. However, over a short period, the error coefficients are expected to follow trends which may be characterized. It is these trends which are modeled by the error coefficients. In essence, the error coefficients impute the error from each satellite in a constellation to an error in the vehicle position. For example, the errors in the x direction for each satellite are averaged together and represented as a single error in the x direction of the vehicle position. Thus, the error coefficients have meaning only to a particular constellation (e.g., four selected satellites) for which they have been computed.

The invention may be used with either an open-ended GPS system or a differential GPS system. In a first embodiment of the open-ended GPS system, eight satellites are used to compute values for a vehicle position, a clock bias, and the four error coefficients. In a second embodiment of the open-ended GPS system, six satellites are used to compute values for a vehicle position, a clock bias, and the four error coefficients. In a third embodiment of the open-ended GPS system, four satellites are used to compute values for a vehicle position, a clock bias, and the tour error coefficients.

In an embodiment of the differential GPS system, five satellites are used in conjunction with a base station to compute values for a clock bias and the four error coefficients. The error coefficients can then be transmitted to a vehicle to be used in the vehicle position computations.

The error coefficients may be computed in conjunction with computation of each vehicle position estimate (i.e., in real time). Alternatively, the error coefficients may be computed once and used in vehicle position computations for a period of time thereafter. Depending on the specific method used to compute the error coefficients, it is anticipated that the values of the error coefficients may be used to increase the accuracy of vehicle position estimates for a length of time in the range of several minutes up to as long as a selected constellation of satellites remains in view.

DESCRIPTION OF THE PREFERRED EMBODIMENT

The present invention is now described with reference to the figures where like reference numbers denote like elements/steps.

Figure 1:
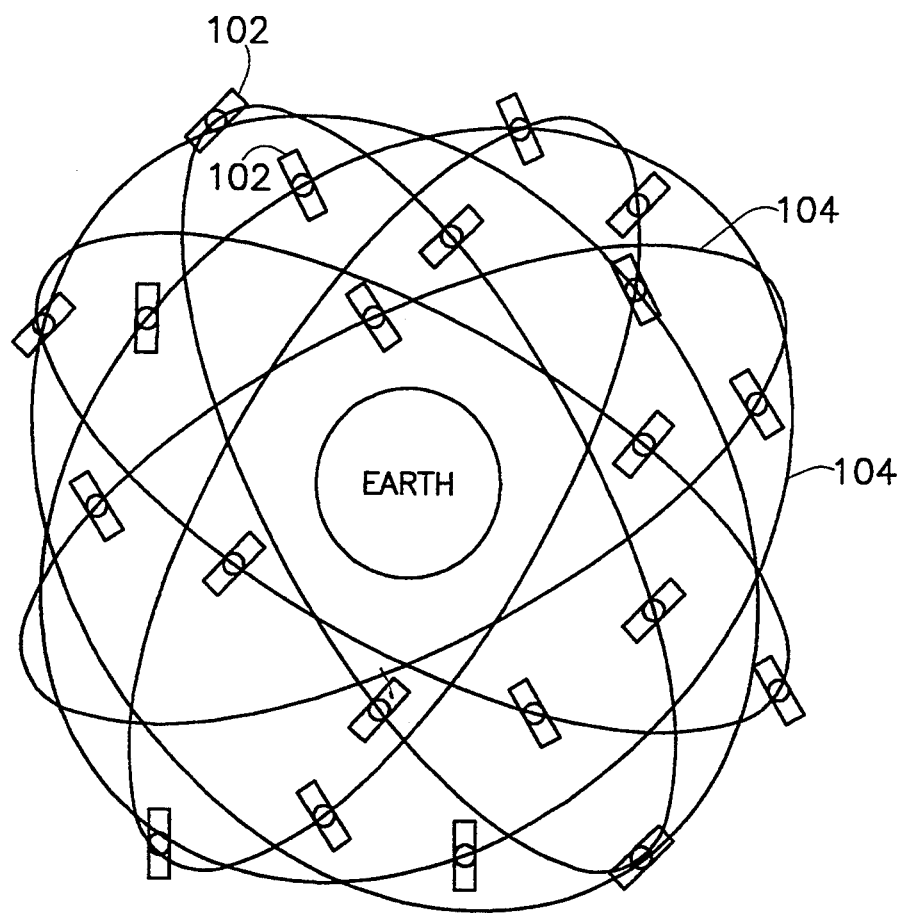
FIG. 1 is a diagram depicting the NAVSTAR GPS satellites in their respective orbits around the Earth.

The invention is a method and apparatus for monitoring the integrity of position data received from a satellite based navigation system. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
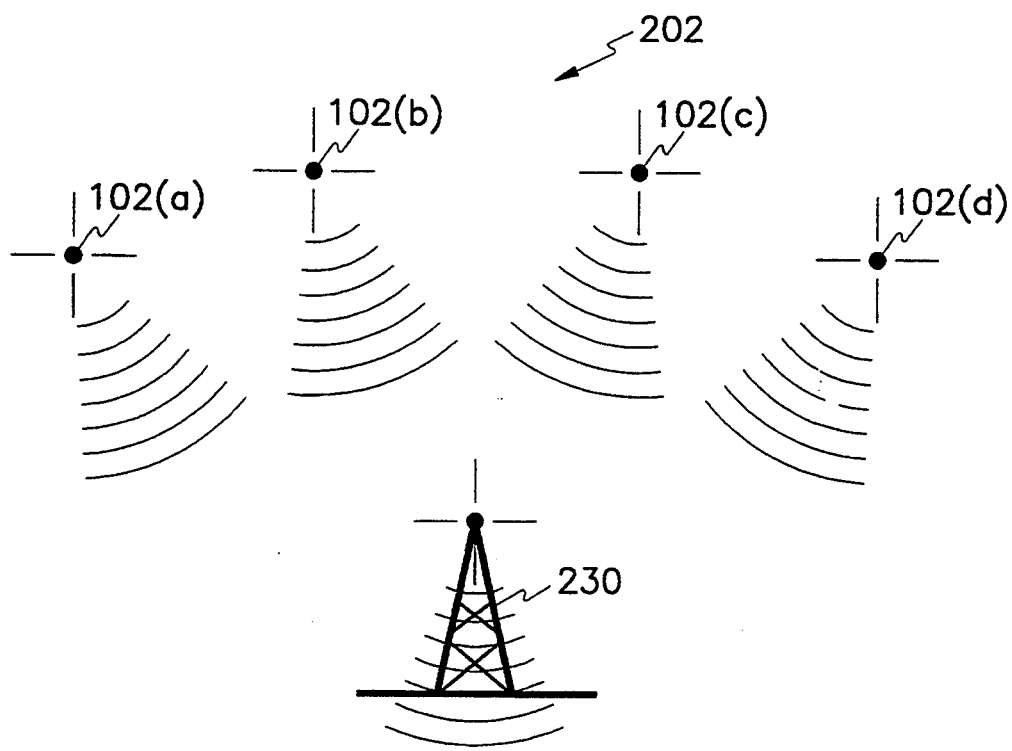
FIG. 2 is a diagram illustrating an autonomous vehicle system which includes a constellation of four GPS satellites, a pseudolite, a base station, and an autonomous vehicle.
Figure 2:
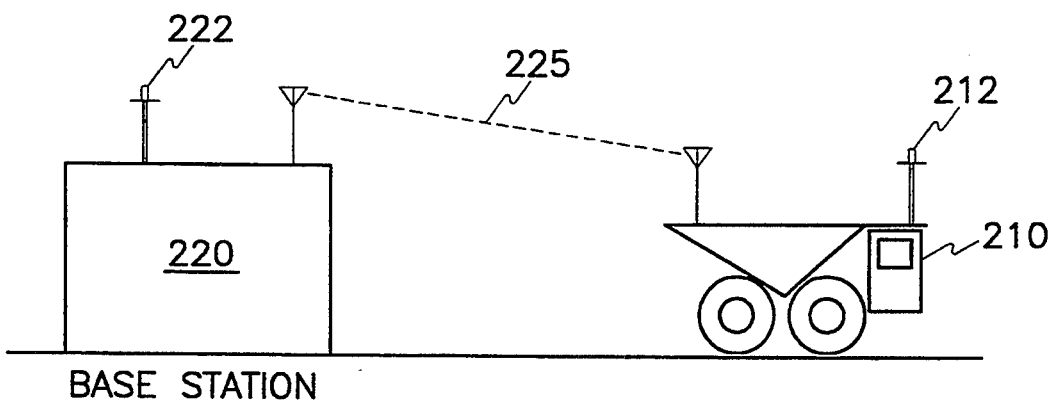

The invention is described in the environment of an autonomous vehicle system 200 as shown in FIG. 2. A representative GPS constellation 202 includes four GPS satellites 102(a)–102(d) for transmitting GPS data. A vehicle (e.g., an autonomous mining truck) 210 and a base station 220 are adapted to receive the GPS data/navigation signals from each GPS satellite 102 in the constellation using respective GPS antennas 212 and 222.

A GPS receiver can receive GPS navigation signals from a satellite which is "in view" of the receiver (i.e., line of sight communications). For example, "in view" may be defined as any satellite that is at least ten degrees up from the horizon. The ten degree angle provides a buffer zone between a useful, in view satellite and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver (i.e., a reference receiver) which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 will be referenced. It should be understood, however, that where position data from a satellite is required, pseudolite data may be substituted.

Figure 3:
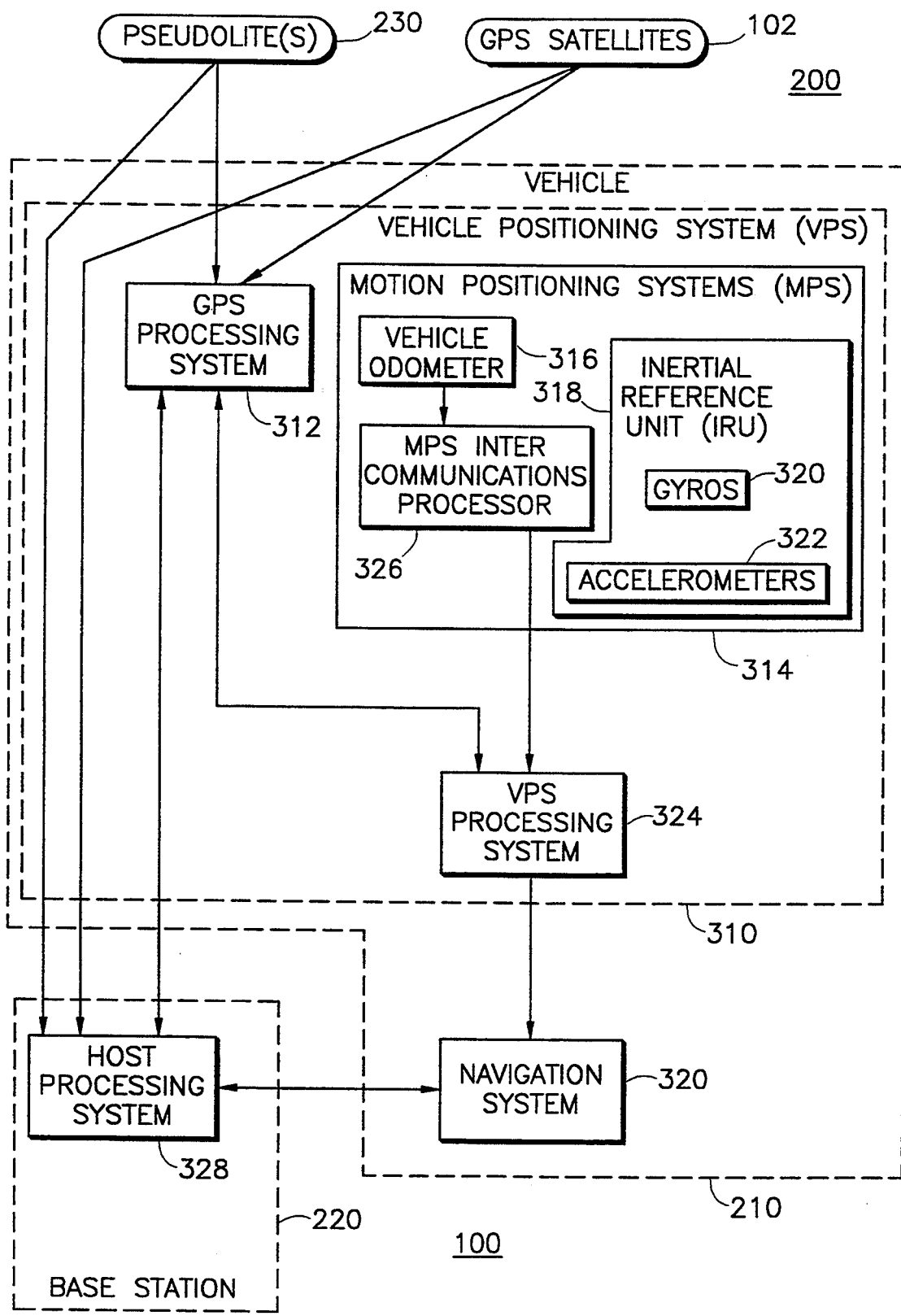
FIG. 3 is a block diagram of the autonomous vehicle system detailing the vehicle positioning system of the autonomous vehicle.

FIG. 3 shows a high-level block diagram of system 200 of the invention, including GPS satellites 102, vehicle 210, base station 220, and pseudolites 230. Vehicle 210 includes a vehicle positioning system (VPS) 310 and a navigation system 320.

Vehicle Positioning System (VPS) 310

The task of guiding vehicle 210 along a prescribed path requires, among other things, an accurate estimate of the vehicle's current position relative to some reference point. Once the current position is known, vehicle 310 can be commanded to proceed to its next destination. VPS 310 allows position estimates of vehicle 210 to be determined with extreme precision.

VPS 310 includes a GPS processing system 312 and a motion positioning system (MPS) 314. GPS processing system 312 receives GPS data, i.e., navigation signals, from GPS satellites 102 and computes a first position estimate (FPE) for vehicle 210 therefrom. MPS 314 includes a vehicle odometer 316 and an inertial reference unit (IRU) 318 which track the position of the vehicle based on changes from an initial known position. MPS 314 produces (the actual computations are done in VPS processing system 324) a second position estimate for vehicle 210. The first position estimate and the second position estimate are independently derived.

The first position estimate (from GPS) may be used as an independent indication of the position of vehicle 210. Similarly, the second position estimate (from MPS) may be used as an independent indication of the position of vehicle 210. In the preferred embodiment, however, the first and second position estimates are combined by a VPS processing system 324 (as discussed below) to produce a more accurate third or best position estimate.

Navigation System 320

Navigation system 320 receives the third position estimate from VPS 314. Navigation system 320 uses this precise, third position estimate to accurately navigate vehicle 210.

GPS Processing System 312

Figure 4:
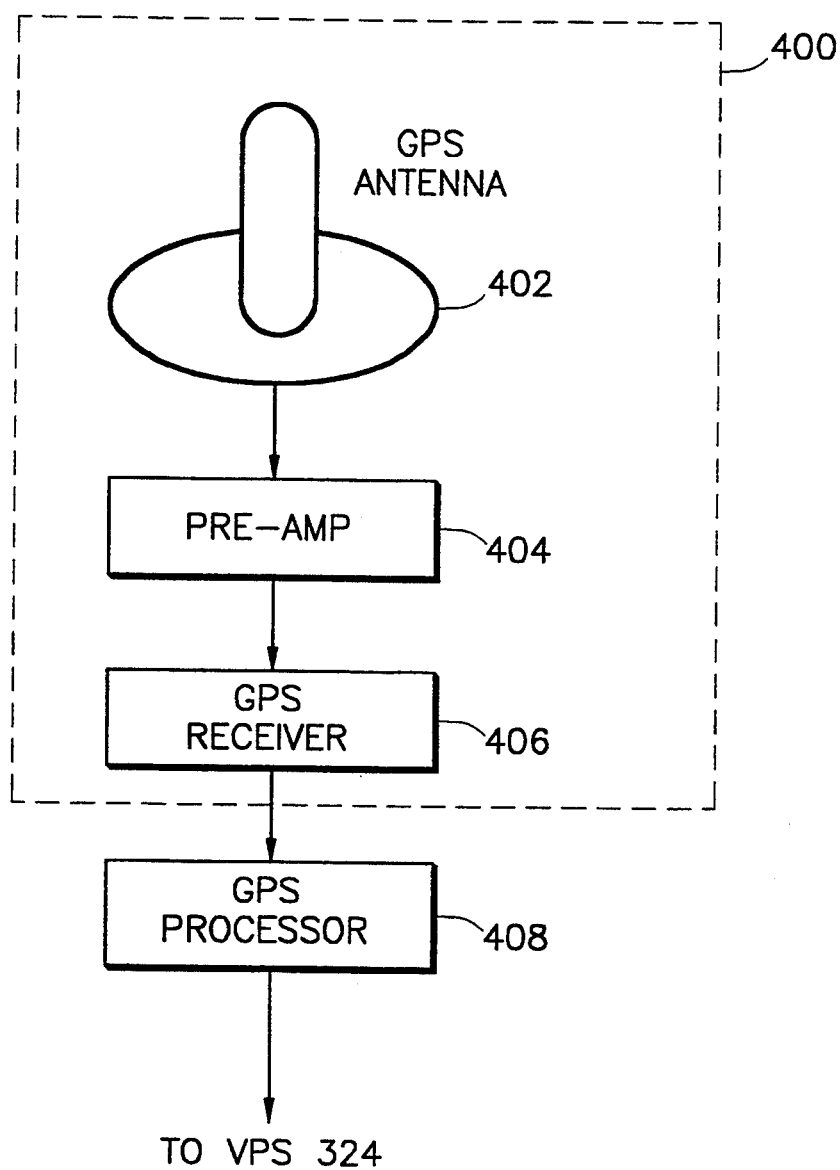
FIG. 4 is a block diagram of a GPS processing system.

GPS processing system 312 is the heart of system 200. With reference to FIG. 4, GPS processing system 312 includes a receiver system 400 and a GPS processor 408. Receiver system 400 receives and decodes the navigation signals from the satellites. GPS processor 408 then uses the information from receiver system 400 to compute the first position estimate. Receiver system 400 includes a GPS antenna 402, a preamplifier 404, and a GPS receiver 406. Antenna 402 is adapted to receive electromagnetic radiation in the radio portion of the spectrum. Preamplifier 404 amplifies a GPS navigation signal received by GPS antenna 402 from a selected GPS satellite. GPS receiver 406 is a multi-channel receiver which decodes the GPS navigation signals and produces a pseudorange and a satellite position for each selected satellite. GPS processor 408 uses the pseudoranges and satellite positions for a plurality of satellites to calculate the first position estimate for vehicle 210.

In the preferred embodiment, antenna 402 and preamplifier 404 are integrated into a single unit. The combined antenna/preamplifier 402/404 and receiver 406 are available together under part number MX4200 from Magnavox Advanced Products and Systems Co., Torrence, Calif. GPS processor 408 includes an MC68020 microprocessor, available from Motorola, Inc., of Schaumburg, Ill.

Receiver 406 computes a pseudoranges for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver. As discussed above, the range is called a "pseudorange" because the receiver clock is not precisely synchronized to GPS time (causing a clock error) and because propagation through the different layers of the atmosphere changes the speed of the propagating signals (causing an atmospheric error).

GPS receiver 406 may use an almanac to roughly determine the position of a satellite (e.g., for acquisition purposes). For a more precise determination of satellite position, the receiver decodes the GPS navigation signal and extracts ephemeris data therefrom. The ephemeris data indicates the precise position of the transmitting satellite.

GPS processor 408 calculates the first position estimate using the pseudoranges and satellite positions from GPS receiver 406. This is described below with reference to FIG. 5.

Figure 5:
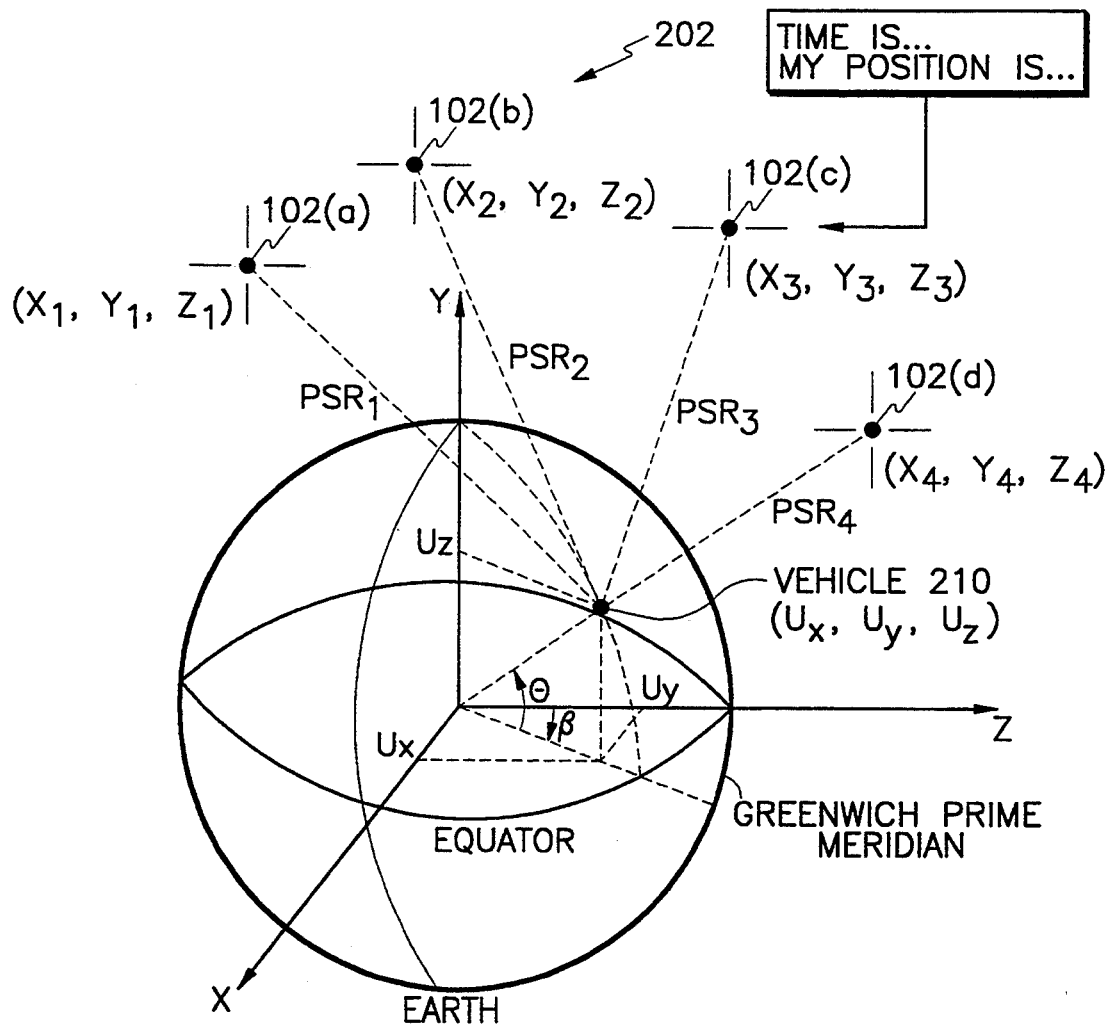
FIG. 5 is a diagram showing the geometric relationship between the center of the Earth, a vehicle near the surface of the Earth and a constellation of GPS satellites.

FIG. 5 shows a sample satellite constellation 202, having GPS satellites $102(a)$–$102(d)$, in view of vehicle 210. In Cartesian coordinates, with respect to the center of the Earth, satellite $102(a)$ is located at $(x_1,y_1,z_1)$; satellite $102(b)$ is located at $(x_2,y_2,z_2)$; satellite $102(c)$ is located at $(x_3,y_3,z_3)$; satellite $102(d)$ is located at $(x_4,y_4,z_4)$; and vehicle 210 is located at a position $(U_x,U_y,U_z)$.

The Cartesian (x,y,z) coordinates of each satellite 102 are determined by GPS receiver 406 using a satellite's ephemeris data. The pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-U_x)^2+(y_1-U_y)^2+(z_1-U_z)^2=(PSR_1-B_{clock})^2 \quad \text{EQ.1}$$

$$(x_2-U_x)^2+(y_2-U_y)^2+(z_2-U_z)^2=(PSR_2-B_{clock})^2 \quad \text{EQ.2}$$

$$(x_3-U_x)^2+(y_3-U_y)^2+(z_3-U_z)^2=(PSR_3-B_{clock})^2 \quad \text{EQ.3}$$

$$(x_4-U_x)^2+(y_4-U_y)^2+(z_4-U_z)^2=(PSR_4-B_{clock})^2 \quad \text{EQ.4}$$

where:

$B_{clock}$=clock bias

The "clock bias" is a zero order correction factor which attempts to compensate for the clock error discussed above.

Note that there are four unknowns in these equations: $U_x$, $U_y$, $U_z$, and $B_{clock}$. Note also that each satellite produces an equation. Thus, we have four satellites and four unknowns, allowing the equations to be solved for the clock bias ($B_{clock}$) and the position ($U_x,U_y,U_z$) of vehicle 210.

If the clock bias ($B_{clock}$) is eliminated, then only three variables remain in the equation such that only three satellites are necessary to solve for the position of vehicle 210. The clock bias can be eliminated if a high precision clock (e.g., an atomic clock) is used in receiver system 400.

If the latitude (L) and longitude (λ) of the vehicle are desired, they can be computed using the following equations:

$$\text{Latitude} \approx \cos^{-1}\sqrt{\frac{U_x^2+U_y^2}{U_x^2+U_y^2+U_z^2}} \quad \text{EQ. 5}$$

$$\text{Longitude} = \tan^{-1}\frac{U_y}{U_x} \quad \text{EQ. 6}$$

Note that this latitude equation provides an approximate latitude. Determination of a more exact latitude requires that a complex iterative process be used.

GPS Processing System 312 and Kalman Filtering

From a user's perspective, GPS processing system 312 is the most important part of the autonomous vehicle system 200. GPS processing system 312 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise (including noise produced by the atmosphere, the preamplifier and the receiver). GPS processing system 312 relies extensively on Kalman Filtering to eliminate the noise from the GPS navigation signals. Kalman filtering is performed in GPS processor 408.

The Kalman filter is a recursive least-squares algorithm which is normally implemented via software or firmware on a digital computer (processor 408). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current data. For example, if a vehicle position $p_1$ and velocity $v_1$ are known at time $t_1$, then the filter (performing the extrapolation step) will use $p_1$ and $v_1$ to estimate a position $p_2$ at a time $t_2$. Thereafter (performing the update step), newly acquired data at time $t_2$ is used to refine the position estimate $p_2$. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," IEEE Transactions on Automatic Control, Vol. AC-28, No. 3, March 1983, the relevant teachings of which are incorporated by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_i$ can be rapidly computed by GPS processor 410 by differentiating the navigation equations and solving for a change in position $(\Delta U_x, \Delta U_y, \Delta U_z)$ from a last known vehicle position $(U_x, U_y, U_z)_{i-1}$ at $t_{i-1}$. This greatly simplifies the solution of the distance equations.

As an alternative to Kalman filtering, least squares estimation or best fit polynomial matching may be used.

Base Station 220

GPS data from constellation 202 of GPS satellites 102 is also received by base station 220. Base station 220 comprises a host processing system 328. Host processing system 328 is similar to GPS processing system 312 of vehicle 210 in that it contains a GPS receiver (e.g., a Magnavox model MX4818) for determining the position of the base station with respect to the center the Earth. The base station is used to make a "differential GPS system".

In a differential GPS system, a GPS computed position of the base station is used in conjunction with the known position of the base station to compute biases. By producing a bias or correction factor for each pseudorange, the base station can quantify and correct errors present in the first position estimate.

The base station can compute biases in a variety of ways. In the preferred embodiment, the GPS computed pseudorange from each satellite is compared to a computed distance (d) between the satellite and the known position of base station 220. The difference is a "differential bias" caused by atmospheric and other errors as discussed above. The base station computes a bias for each satellite used in the position computations. These biases, when communicated to the vehicle over communication channel 225, can be used to improve the accuracy of first position estimate.

The distance (d) between a satellite at a position (x,y,z) and a base station at a position $(B_x, B_y, B_z)$ is computed using the standard distance equation:

$$(x-B_x)^2+(y-B_y)^2+(z-B_z)^2=d^2 \qquad \text{EQ.7}$$

The position (x,y,z) of the satellite is computed from the satellite's ephemeris data.

The differential GPS system assumes that vehicle 210 is located relatively close to base station 220, e.g., within 40 km, such that the atmospheric errors present at base station 220 are approximately the same as the atmospheric errors present at vehicle 210. This allows the vehicle to correct, i.e., improve the accuracy of, the vehicle's first position estimate based on information generated at the base station.

Motion Positioning System (MPS) 314

As discussed above, MPS 314 includes a vehicle odometer 316 and an inertial reference unit (IRU) 318 which track the position of the vehicle based on changes from an initial known position. The vehicle odometer 316 produces data on the distance travelled by vehicle 210. The IRU 318 comprises laser gyroscope(s) 320 and accelerometer(s) 322 which can be used to produce position, velocity, roll, pitch and yaw data. MPS 314 provides the IRU data and the odometer data to VPS processing system 324. An MPS inter-communications processor 326 controls the format of the MPS data which is provided to VPS processing system 324. From this data, VPS processing systems 324 produces a second position estimate for vehicle 210.

VPS Processing System 324

Figure 6:
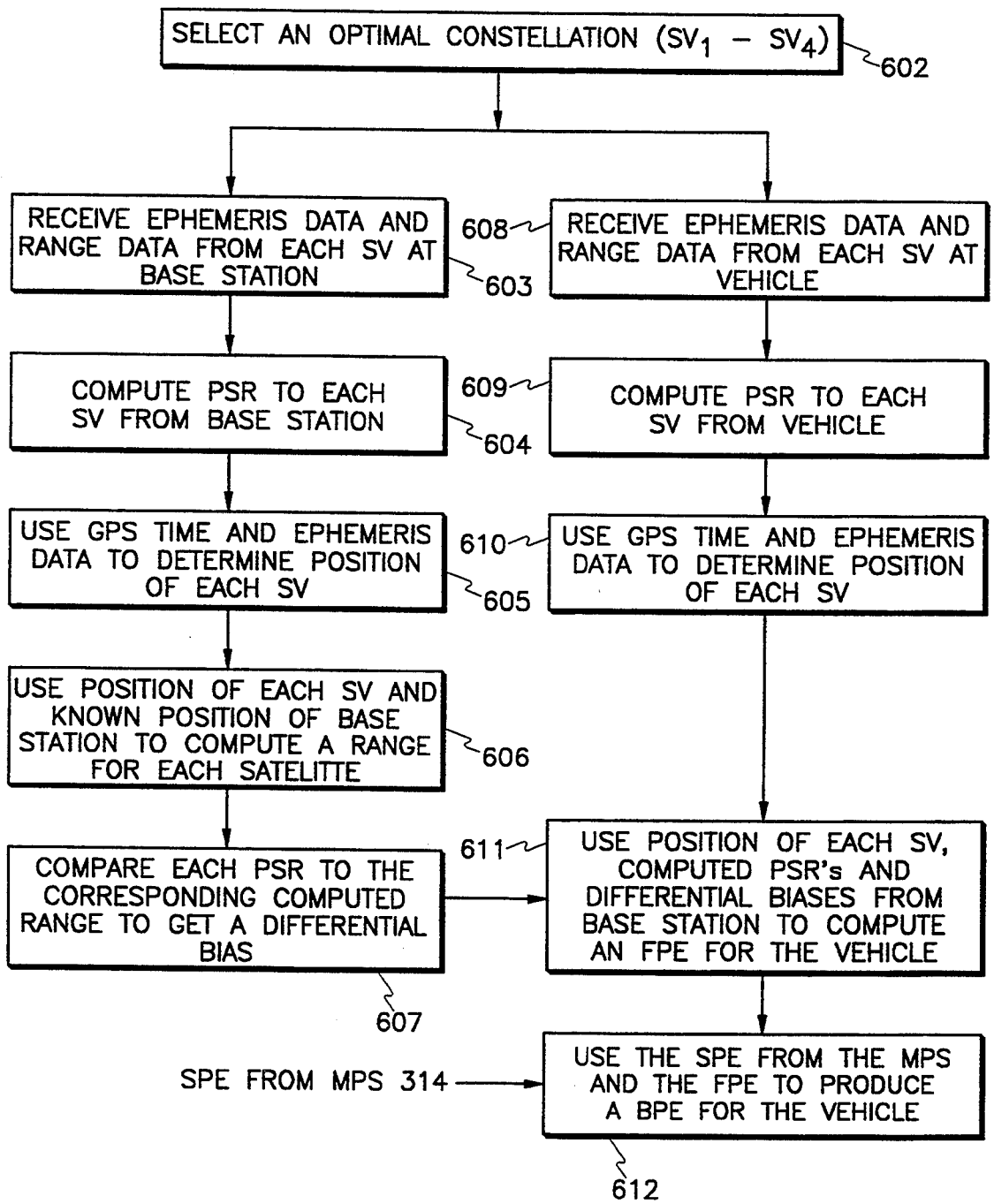
FIG. 6 is a flow chart illustrating the steps of computing a best position estimate for a vehicle.

As mentioned above, the first position estimate (FPE) from GPS may be used as an independent indication of the position of vehicle 210. Similarly, the second position estimate (SPE) computed from MPS data may be used as an independent indication of the position of vehicle 210. In the preferred embodiment, however, the first and second position estimates are combined by VPS processing system 324 to produce a more accurate third or best position estimate (BPE). To accomplish this, VPS processing system relies on Kalman filtering and on weighted averaging to optimally combine the data from GPS processing system 312 with the data from MPS 314. This method for producing a BPE is illustrated in a flow chart 600 of FIG. 6.

At a step 602, an optimal constellation of satellites (designated "SV" for "space vehicle") $SV_1$-$SV_4$ is selected. While at least four satellites are required, a greater number may be used to improve the accuracy of the first position estimate. Steps 603–607 are concerned with producing a differential bias for each satellite as discussed above. Steps 608–612 are concerned with using GPS data and the differential biases to compute an accurate first position estimate (FPE) and for combining the FPE with a second position estimate (SPE) from MPS 314 to produce a third or best position estimate (BPE).

Computation of a differential bias at the base station proceeds as follows. At step 603, the ephemeris data and range data are received from each satellite. The pseudorange (PSR) to each satellite is determined at step 604. Then, at step 605, the position of each satellite is computed using the ephemeris data and the GPS time. At step 606, a range between each satellite and the base station is computed as discussed above using the known position of the base and the ephemeris indicated position of each satellite. At step 607, the computed pseudorange for each satellite is compared to the computed range between the base station and the corresponding satellite. This comparison yields a "differential bias" for each satellite. The differential biases are transmitted to the vehicle for use in computing an accurate first position estimate.

Computation of a best position estimate at the vehicle proceeds as follows. At step 608, the ephemeris data and range data are received from each satellite. The pseudoranges (PSR's) to each satellite are determined at step 609. Then, at step 610, the position of each satellite is computed using the ephemeris data and the GPS time. At step 611, an FPE is computed for vehicle 210 using the pseudoranges from step 609, the satellite positions from step 610, and the differential biases from the base station (step 607). Finally, at step 612, the second position estimate from MPS 314 and the first position estimate from step 611 are combined to produce a third or best position estimate (BPE) for vehicle 210.

In the preferred embodiment, the FPE and the SPE are combined using a weighted combiner. Because the FPE is inherently more accurate, it is normally given more weight then the SPE. However, since both the FPE and the SPE are independently derived, either can be given full weight if the other becomes corrupted. The weighting factors are assigned based on the estimated respective accuracies.

Note that steps 603–607 are performed at base station 220, while steps 608–612 are performed simultaneously at vehicle 210. If desired, the raw GPS data (pseudoranges and satellite positions) may be transmitted from base station 220 to vehicle 210. All computations may then be carried out at vehicle 210.

While the BPE is a fairly accurate estimate of vehicle position, it is not flawless. As discussed above, the first position estimate includes non-linear errors which are not corrected for by the differential system. These errors, which prevent high-precision position estimates, include satellite wobble and atmospheric effects.

The present invention is a method and system for modeling these non-linear errors and factoring them into the position equations so that a more precise position estimate is computed. The standard navigation equation is modified to include the error coefficients $\alpha$, $\beta$, $\gamma$ and $\delta$. $\alpha$ is used to model errors in the x dimension. $\beta$ is used to model errors in the y dimension. $\gamma$ is used to model errors in the z dimension. $\delta$ is used to model errors in the pseudoranges.

Because the error sources (which are being modeled using $\alpha$, $\beta$, $\gamma$, $\delta$) are random in nature, each will have a zero mean and will be unpredictable over time. However, over a short period, the error coefficients are expected to follow trends which may be characterized. It is these trends which are modeled by the error coefficients. In essence, the error coefficients impute the error from each satellite in the constellation to an error in the vehicle position. For example, the errors in the x direction for each satellite are averaged together and represented as a single error in the x direction of the vehicle position. Thus, the error coefficients have meaning only to the particular constellation (e.g., four selected satellites) for which they have been computed.

The coefficients $\alpha$, $\beta$, $\gamma$ and $\delta$ model the satellite errors linearly, however, they become non-linear when they are squared in the distance equation:

$$(x_i - \alpha U_x)^2 + (y_i - \beta U_y)^2 + (z_i - \gamma U_z)^2 = (\delta PSR_i - B_{clock})^2 \quad \text{EQ.8}$$

The clock bias ($B_{clock}$) has been included in this equation to account for the steady state offset in a pseudorange caused by a clock differential. The $\delta$ coefficient will correct for any non-linear pseudorange perturbations.

In Equation 8, the error coefficients $\alpha$, $\beta$, $\gamma$ and $\delta$ are multiplied by the vehicle position coordinates and pseudorange to compensate for non-linear errors. In an alternate embodiment of the invention, error addends (rather than coefficients) can be added to or subtracted from the respective vehicle position coordinates and pseudorange. This is illustrated in Equation 9.

$$(x_i - U_x - \alpha)^2 + (y_i - U_y - \beta)^2 + (z_i - U_z - \delta)^2 = (PSR_i - \delta - B_{clock})^2 \quad \text{EQ.9}$$

Typically in doing a GPS position computation, values for four variables must be determined. These include the vehicle position coordinates $U_x$, $U_y$ and $U_z$ and the clock bias. With the present invention, values must be computed for an additional four variables. These include the error coefficients $\alpha$, $\beta$, $\gamma$ and $\delta$. Thus, values must be computed for a total of eight variables. A solution for these eight unknowns can be calculated in a variety of ways. The solutions may use an open-ended (without base station 220) GPS system or a differential (with base station 220) GPS system. Both applications are discussed in detail below.

Open-Ended GPS System

In a first application for the invention, an open-ended or non-differential GPS system is used. In a first embodiment for this application, eight satellites ($SV_i$, where $i = 1 \rightarrow 8$) are used in conjunction with Equation 8 to create eight distance equations. These equations may then be used to solve for $U_x$, $U_y$, $U_z$, $\alpha$, $\beta$, $\gamma$, $\delta$ and the clock bias. While this first embodiment is a forthright solution to the problem, a constellation having eight satellites will not always be available in the NAVSTAR GPS. Thus, this solution may not be practical for all systems.

Figure 7:
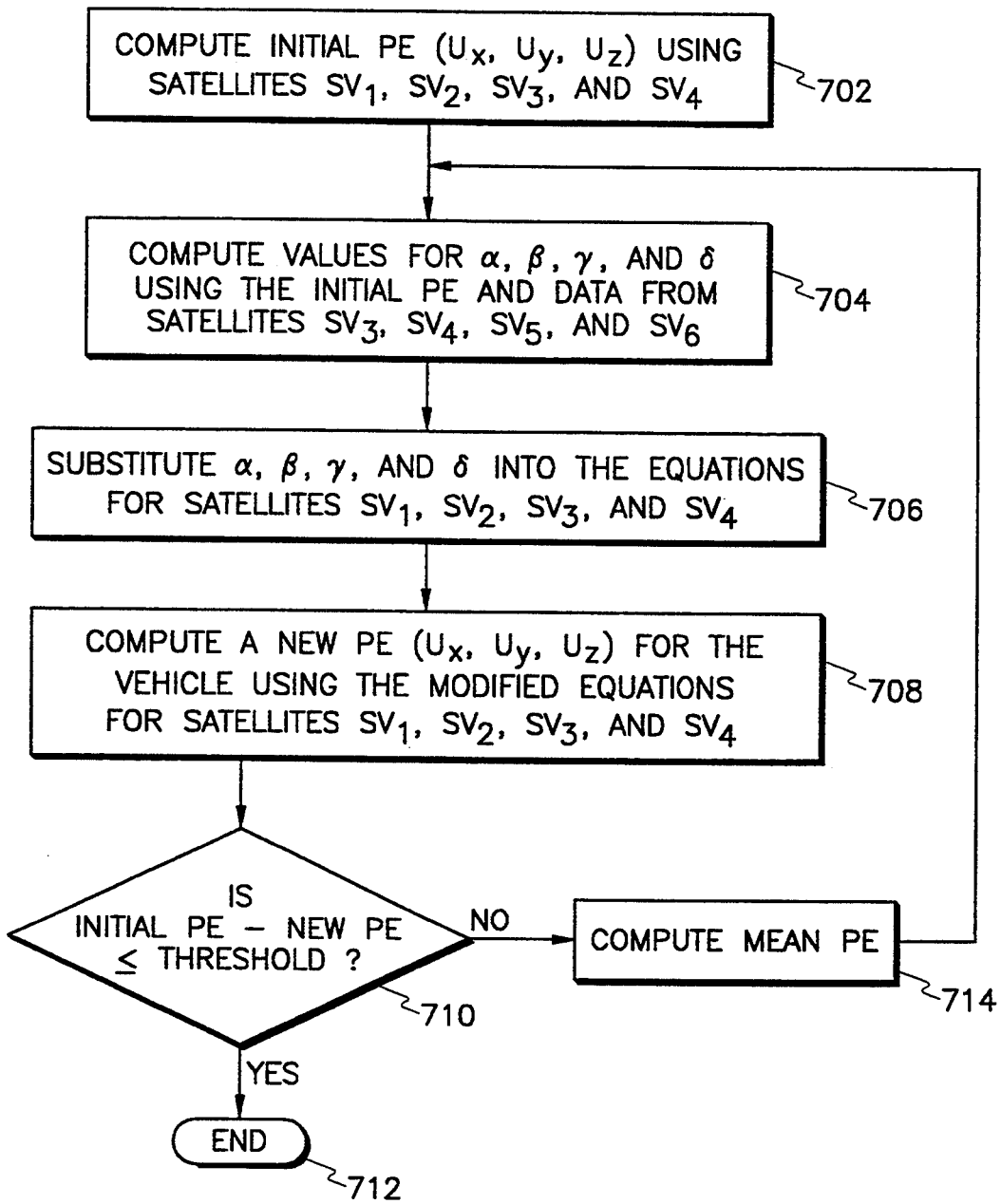
FIG. 7 is a flow chart illustrating a first method according to the invention for computing a precise position estimate using an open-ended GPS system.

In a second embodiment, the error coefficients are calculated using only six satellites ($SV_i$, where $i = 1 \rightarrow 6$). This method is illustrated in a flow chart 700 shown in FIG. 7. In a step 702, an initial position estimate (PE) is computed using data from four satellites (e.g., $SV_1$, $SV_2$, $SV_3$ and $SV_4$) and the following equations:

$$(x_1 - U_x)^2 + (y_1 - U_y)^2 + (z_1 - U_z)^2 = (PSR_1 - B_{clock})^2 \quad \text{EQ.10}$$

$$(x_2 - U_x)^2 + (y_2 - U_y)^2 + (z_2 - U_z)^2 = (PSR_2 - B_{clock})^2 \quad \text{EQ.11}$$

$$(x_3 - U_x)^2 + (y_3 - U_y)^2 + (z_3 - U_z)^2 = (PSR_3 - B_{clock})^2 \quad \text{EQ.12}$$

$$(x_4 - U_x)^2 + (y_4 - U_y)^2 + (z_4 - U_z)^2 = (PSR_4 - B_{clock})^2 \quad \text{EQ.13}$$

Next, at step 704, values for $\alpha$, $\beta$, $\gamma$ and $\delta$ are computed using the initial PE ($U_x, U_y, U_z$) and $B_{clock}$ computed in step 702, dam from satellites $SV_3$, $SV_4$, $SV_5$ and $SV_6$ and the following equations:

$$(x_3 - \alpha U_x)^2 + (y_3 - \beta U_y)^2 + (z_3 - \gamma U_z)^2 = (\delta PSR_3 - B_{clock})^2 \quad \text{EQ.14}$$

$$(x_4 - \alpha U_x)^2 + (y_4 - \beta U_y)^2 + (z_4 - \gamma U_z)^2 = (\delta PSR_4 - B_{clock})^2 \quad \text{EQ.15}$$

$$(x_5 - \alpha U_x)^2 + (y_5 - \beta U_y)^2 + (z_5 - \gamma U_z)^2 = (\delta PSR_5 - B_{clock})^2 \quad \text{EQ.16}$$

$$(x_6 - \alpha U_x)^2 + (y_6 - \beta U_y)^2 + (z_6 - \gamma U_z)^2 = (\delta PSR_6 - B_{clock})^2 \quad \text{EQ.17}$$

The values for $\alpha$, $\beta$, $\gamma$ and $\delta$ are then substituted into the equations for satellites $SV_1$, $SV_2$, $SV_3$ and $SV_4$ at a step 706. This results in the equations:

$$(x_1 - \alpha U_x)^2 + (y_1 - \beta U_y)^2 + (z_1 - \gamma U_z)^2 = (\delta PSR_1 - B_{clock})^2 \quad \text{EQ.18}$$

$$(x_2 - \alpha U_x)^2 + (y_2 - \beta U_y)^2 + (z_2 - \gamma U_z)^2 = (\delta PSR_2 - B_{clock})^2 \quad \text{EQ.19}$$

$$(x_3 - \alpha U_x)^2 + (y_3 - \beta U_y)^2 + (z_3 - \gamma U_z)^2 = (\delta PSR_3 - B_{clock})^2 \quad \text{EQ.20}$$

$$(x_4 - \alpha U_x)^2 + (y_4 - \beta U_y)^2 + (z_4 - \gamma U_z)^2 = (\delta PSR_4 - B_{clock})^2 \quad \text{EQ.21}$$

From these modified equations for satellites $SV_1$, $SV_2$, $SV_3$ and $SV_4$, a new PE ($U_x, U_y, U_z$) is computed at step 708.

At step 710, the new PE (from step 708) is compared to the initial PE (from step 702). If the difference between the two PE's is less than or equal to a predetermined threshold, then the calculations end at step 712. If, however, the difference is greater than the predetermined threshold, then the method proceeds to step 714.

At step 714, the initial PE and the new PE are averaged to produce a mean PE. The method then returns to step 704 where the mean PE is used to re-compute the error coefficients. Thus, method 700 is an iterative process which repeats until the difference between the new PE and the initial PE (or mean PE) is less than or equal to the predetermined threshold. As the method repeats, all successively computed PE's are averaged to compute the mean PE at step 714.

The predetermined threshold is selected to achieve a desired accuracy for the PE. As the threshold approaches zero, the accuracy of the PE will increase. However, the cost of the greater accuracy is an increased number of iterations of steps 704, 706, 708, 710 and 714. This results in increased computation time.

As an alternative to step 714 where a mean PE is computed, the initial PE may be set to the value of the new PE, and the new PE may be used at step 704 to re-compute the error coefficients. This alternative, however, will require more iterations in order to converge on the ideal position estimate.

In any of the embodiments discussed herein, a precise time reference, such as an atomic clock, may be used in receiver 406. This will eliminate the clock error from the computations and allow precise position estimates with one less satellite. For example, in the embodiment discussed directly above, only five satellites must be used to compute a precise position estimate. In that case, step 702 could use data from satellites $SV_1$, $SV_2$, and $SV_3$, and step 704 could use data from satellites $SV_2$, $SV_3$, $SV_4$ and $SV_5$.

Alternatively, the clock bias factor ($B_{clock}$) may be eliminated from the position computation equations and merged into the $\delta$ error coefficient. In that case, the $\delta$ error coefficient will compensate for the clock differential. This approach would also require one less satellite for the position computations. However, the $\delta$ error coefficient cannot uniformly compensate for a fixed clock differential by multiplying a constant value times varying pseudorange values. Thus, a value of $\delta$ would have to be selected which is a compromise of the ideal value. For this reason, this approach is not preferred.

In the preferred implementation of this embodiment, the initial PE computed at step 702 will actually be a best position estimate (BPE). This will produce a more accurate initial position estimate, which will in turn allows method 700 to converge on a solution more quickly. In fact, any additional constraints which will assist convergence of a solution are desirable because the solution for the error coefficients involves a massive amount of computing which must be done very quickly to provide the necessary position information to a vehicle. These additional constrains may include, for example, data from: a laser ranging system having laser targets with known fixed positions, a base station, a pseudolite, and/or a vehicle velocity measurement.

Solving for the error coefficients ($\alpha$, $\beta$, $\gamma$ and $\delta$) in the equations of step 704 can become quite complex. An example of a solution using perturbation theory follows. Note that for ease of discussion no clock bias is included into the computations.

Represent each satellite $SV_i$ with the following generic equation:

$$(x_i - \alpha U_x)^2 + (y_i - \beta U_y)^2 + (z_i - \delta U_z)^2 = \delta PSR_i^2 \quad \text{EQ.22}$$

Substitute $\alpha = 1 - \epsilon_x$, $\beta = 1 - \epsilon_y$, $\gamma = 1 - \epsilon_z$, and $\delta = 1 - \epsilon_P$ (Note that $\epsilon_x$, $\epsilon_y$, $\epsilon_z$ and $\epsilon_P \approx 0$) to yield:

$$(x_i - U_x + \epsilon_x U_x)^2 + (y_i - U_y + \epsilon_y U_y)^2 + (z_i - U_z + \epsilon_z U_z)^2 = (PSR_i - \epsilon_P)^2 \quad \text{EQ.23}$$

If this equation is expanded and the terms $(\epsilon_x U_x)^2$, $(\epsilon_y U_y)^2$, $(\epsilon_z U_z)^2$, and $(\epsilon_P PSR_i)^2$ are assumed to be very small compared to the terms $(x_i - U_x)$, $(y_i - U_y)$, $(z_i - U_z)$ and $PSR_i^2$, then the terms $(\epsilon_x U_x)^2$, $(\epsilon_y U_y)^2$, $(\epsilon_z U_z)^2$, and $(\epsilon_P PSR_i)^2$ can be neglected. This yields:

$$(x_i - U_x)^2 - 2\epsilon_x U_x(x_i - U_x) + (y_i - U_y)^2 - 2\epsilon_y U_y(y_i - U_y) + (z_i - U_z)^2 - 2\epsilon_z U_z(z_i - U_z) = (PSR_i)^2 - 2(PSR_i)^2 \epsilon_P \quad \text{EQ.24}$$

Next, define $F_i = (x_i - U_x)^2 + (y_i - U_y)^2 + (z_i - U_z)^2$ and substitute this into the above equation to yield:

$$\frac{F_i}{2} - \epsilon_x U_x(x_i - U_x) - \epsilon_y U_y(y_i - U_y) - \epsilon_z U_z(z_i - U_z) + \epsilon_P(PSR_i)^2 = 0 \quad \text{EQ. 25}$$

Given the four satellites ($SV_2$, $SV_3$, $SV_4$, and $SV_5$) from step 704 discussed above, this equation can be used to produce the following four equations:

$$\frac{F_2}{2} - \epsilon_x U_x(x_2 - U_x) - \epsilon_y U_y(y_2 - U_y) - \epsilon_z U_z(z_2 - U_z) + \epsilon_P(PSR_2)^2 = 0 \quad \text{EQ. 26}$$

$$\frac{F_3}{2} - \epsilon_x U_x(x_3 - U_x) - \epsilon_y U_y(y_3 - U_y) - \epsilon_z U_z(z_3 - U_z) + \epsilon_P(PSR_3)^2 = 0 \quad \text{EQ. 27}$$

$$\frac{F_4}{2} - \epsilon_x U_x(x_4 - U_x) - \epsilon_y U_y(y_4 - U_y) - \epsilon_z U_z(z_4 - U_z) + \epsilon_P(PSR_4)^2 = 0 \quad \text{EQ. 28}$$

$$\frac{F_5}{2} - \epsilon_x U_x(x_5 - U_x) - \epsilon_y U_y(y_5 - U_y) - \epsilon_z U_z(z_5 - U_z) + \epsilon_P(PSR_5)^2 = 0 \quad \text{EQ. 29}$$

These four equations are then solved for $\epsilon_x$, $\epsilon_y$, $\epsilon_z$ and $\epsilon_P$ by substitution.

A specific, numerical example of the improvement in precision of a position estimate which can be achieved by the invention is provided below. The computations were performed on a general purpose computer using a math spreadsheet program. The ideal vehicle position $(U_x, U_y, U_z)$ is (1,2,3). The five satellites used for the example have the following positions and pseudoranges:

| Satellite # | x | y | z | PSR$^2$ |
|---|---|---|---|---|
| 1 | 2 | 3 | 4 | 3 |
| 2 | 5 | 5 | 5 | 29 |
| 3 | 6 | 6 | 6 | 50 |
| 4 | 3 | 4 | 5 | 12 |
| 5 | 4 | 5 | 6 | 27 |

If the pseudorange ($PSR_2$) for satellite #2 is perturbed with a 0.0001% error (i.e. $PSR_2^2 = 29.00003$), then the resulting position estimate (step 702) for the vehicle will change from (1,2,3) to (1.002182, 1.995608, 3.002225). This represents a positioning error of (0.218%, −0.220%, 0.074%) in the x, y, and z directions, respectively.

If the data from satellites #2, #3, #4 and #5 are used in conjunction with the initial position estimate to compute (step 704) values for the error coefficients, the following values result:

$\epsilon_x = 0.00439$
$\epsilon_y = -0.00440$
$\epsilon_z = 0.00147$
$\epsilon_P = -2.4 \times 10^{-6}$ Recall that $\alpha = 1 - \epsilon_x$, $\beta = 1 - \epsilon_y$, $\gamma = 1 - \epsilon_z$, and $\delta = 1 - \epsilon_P$. The values of $\alpha$, $\beta$, $\gamma$ and $\delta$ can then be used to recompute (steps 706 and 708) the vehicle position using the data from satellites #1, #2 and #3 to produce a refined vehicle position. This results in a refined vehicle position of (0.9987, 2.0025, 2.9987). This refined vehicle position includes an error of (−0.1253%, 0.1269%, −0.0443%) for the x, y and z directions, respectively.

Compare the error in the initial position with the error in the refined position. Note that the error is varying sinusoidally as it converges on the ideal position. With additional iterations, the solution will converge on the ideal position. However, a more efficient method of converging on the ideal solution is to find the mean position estimates. For example, the average of the initial position estimate and the refined position estimate will produce a mean position estimate of (1.0004, 1.9991, 3.0004). This mean position estimate reflects an error from the ideal position of (0.0464%, −0.0463%, 0.0150%) in the x, y and z directions, respectively. Thus, the invention has yielded an 80% reduction in position error. Averaging the position estimates from additional successive iterations of method 700 will result in a further increase in the precision of the final position estimate.

Errors in the ephemeris data (i.e., satellite position) will effect the corresponding pseudorange. Therefore, all satellite errors may be effectively modeled as a pseudorange perturbation. Note that the example set forth above involves a perturbation of only one pseudorange. If the data from more than one satellite is perturbed, the method of the invention will continue to have application. However, a greater number of iterations may be needed to achieve a desired increase in positioning accuracy.

Figure 8:
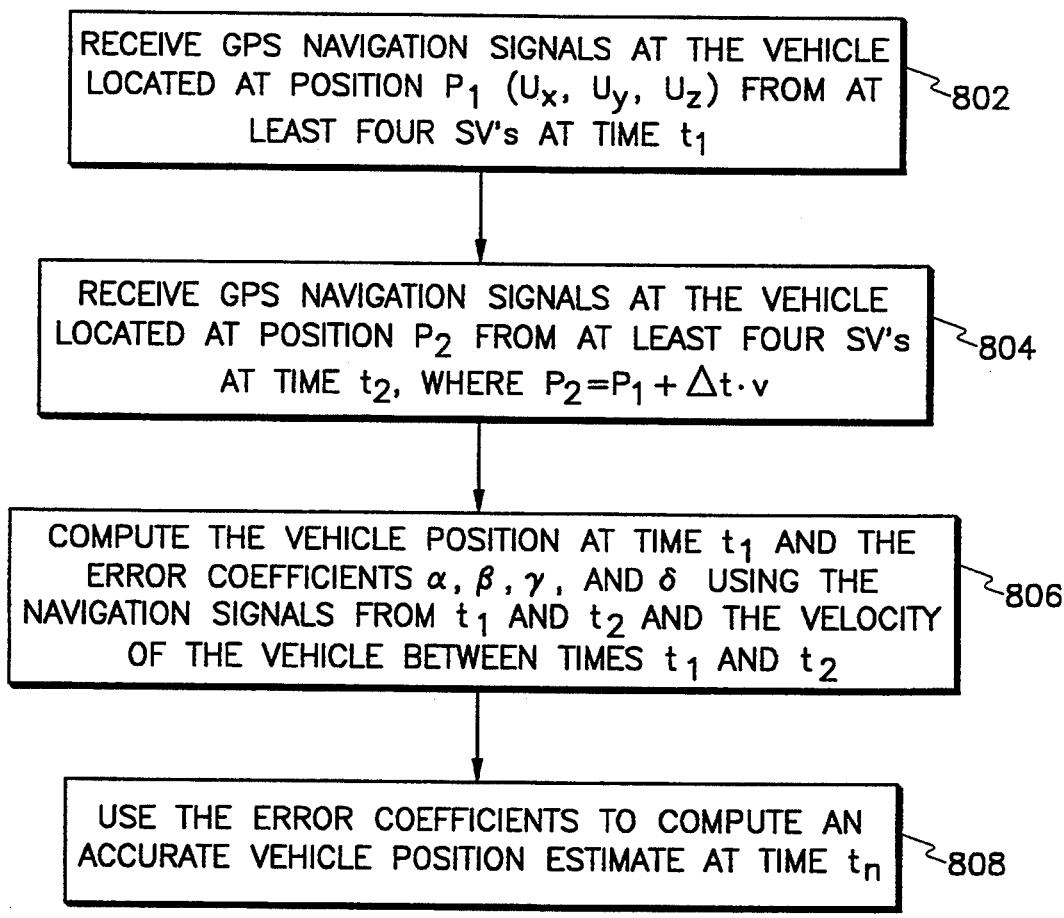
FIG. 8 is a flow chart illustrating a second method according to the invention for computing a precise position estimate using an open-ended GPS system.

In a third embodiment of the invention, only four satellites are required to compute a precise vehicle position estimate. This is illustrated in method 800 of FIG. 8. In a step 802, GPS navigation signals are received at vehicle 210 at a time $t_1$ from at least four satellites. At time $t_1$, the vehicle is located at a position $P_1$ $(U_x, U_y, U_z)$. Similarly, in a step 804, GPS navigation signals are received at vehicle 210 at a time $t_2$. At time $t_2$, the vehicle is located at a position $P_2$, wherein $P_2 = P_1 + \Delta t \cdot v = (U_x + \Delta t \cdot v_x, U_y + \Delta t \cdot v_y, U_z + \Delta t \cdot v_z)$. $\Delta t$ is equal to $t_2 - t_1$. $v$ is equal to the average velocity of the vehicle as it travels between $P_1$ and $P_2$. The x, y and z components of the velocity $(v_x, v_y, v_z)$ can be accurately determined from the phase of the carrier wave of the GPS navigation signals using accumulated delta range techniques, as is known in the art.

At a step 806, the navigation data from steps 802 and 804 is used to compute values for the error coefficients $\alpha$, $\beta$, $\gamma$ and $\delta$ and a precise position of the vehicle. This computation can be performed, for example, using the following eight equations:

$$(x_1 - \alpha U_x)^2 + (y_1 - \beta U_y)^2 + (z_1 - \gamma U_z)^2 = (\delta PSR_1 - B_{clock})^2 \quad \text{EQ.30}$$

$$(x_2 - \alpha U_x)^2 + (y_2 - \beta U_y)^2 + (z_2 - \gamma U_z)^2 = (\delta PSR_2 - B_{clock})^2 \quad \text{EQ.31}$$

$$(x_3 - \alpha U_x)^2 + (y_3 - \beta U_y)^2 + (z_3 - \gamma U_z)^2 = (\delta PSR_3 - B_{clock})^2 \quad \text{EQ.32}$$

$$(x_4 - \alpha U_x)^2 + (y_4 - \beta U_y)^2 + (z_4 - \gamma U_z)^2 = (\delta PSR_4 - B_{clock})^2 \quad \text{EQ.33}$$

$$(x_1 - \alpha U_x - v_x \Delta t)^2 + (y_1 - \beta U_y - v_y \Delta t)^2 + (z_1 - \gamma U_z - v_z \Delta t)^2 = (\delta PSR_1 - B_{clock})^2 \quad \text{EQ.34}$$

$$(x_2 - \alpha U_x - v_x \Delta t)^2 + (y_2 - \beta U_y - v_y \Delta t)^2 + (z_2 - \gamma U_z - v_z \Delta t)^2 = (\delta PSR_2 - B_{clock})^2 \quad \text{EQ.35}$$

$$(x_3 - \alpha U_x - v_x \Delta t)^2 + (y_3 - \beta U_y - v_y \Delta t)^2 + (z_3 - \gamma U_z - v_z \Delta t)^2 = (\delta PSR_3 - B_{clock})^2 \quad \text{EQ.36}$$

$$(x_4 - \alpha U_x - v_x \Delta t)^2 + (y_4 - \beta U_y - v_y \Delta t)^2 + (z_4 - \gamma U_z - v_z \Delta t)^2 = (\delta PSR_4 - B_{clock})^2 \quad \text{EQ.37}$$

These eight equations allow solution of values for the eight unknowns: $\alpha$, $\beta$, $\gamma$, $\delta$, $U_x$, $U_y$, $U_z$ and $B_{clock}$. Note that Equations 30–33 use satellite positions (e.g., $x_1, y_1, z_1$) and pseudoranges (e.g., $PSR_1$) from time $t_1$, while Equations 34–37 use satellite positions (e.g., $x_1, y_1, z_1$) and pseudoranges (e.g., $PSR_1$) from time $t_2$. Thus, the variables used to represent satellite positions and pseudoranges in the first four equations will have different values than in the second four equations because they are taken at different times.

Once the error coefficients have been computed, they can be used at a next time $t_n$ to compute a precise position estimate for the vehicle using these four satellites. This is illustrated at step 808. It is anticipated that the values of the error coefficients computed in this manner may be used to increase the accuracy of first position estimates for a length of time in the range of several minutes up to as long as the selected constellation of four satellites remains in view. Thereafter, steps 802–806 must be repeated to compute new values of the error coefficients.

Alternatively, step 808 can be omitted and steps 802–806 can be repeated for each vehicle position computation. The error coefficients are continuously computed each time a first position estimate is computed. This results in the continuous refining of the error coefficients and, as a result, more accurate first position estimates. If desired, a Kalman filter can be used to smooth the error coefficients.

It is anticipated that the invention, illustrated by the embodiments set forth above, will provide position estimates which are accurate to within a fraction of a meter without the use of a base station.

Differential GPS System

A base station 220 will often be available for use in the vehicle position computations. A base station can simplify and improve the accuracy of the solution for the error coefficients $\alpha$, $\beta$, $\gamma$ and $\delta$. For example, base station 220 can receive navigation signals from five satellites ($SV_1$, $SV_2$, $SV_3$, $SV_4$ and $SV_5$). The pseudoranges and satellite positions from these five satellites can then be used in conjunction with the known position of base station 220 to solve five equations for $\alpha$, $\beta$, $\gamma$, $\delta$ and $B_{clock}$. The error coefficients can then be transmitted to the vehicle over a radio link for use in improving the accuracy of the position determination for the vehicle. The vehicle may then compute its position using at least four of the five satellites used by the base station and the error coefficients received from the base station.

Figure 9:
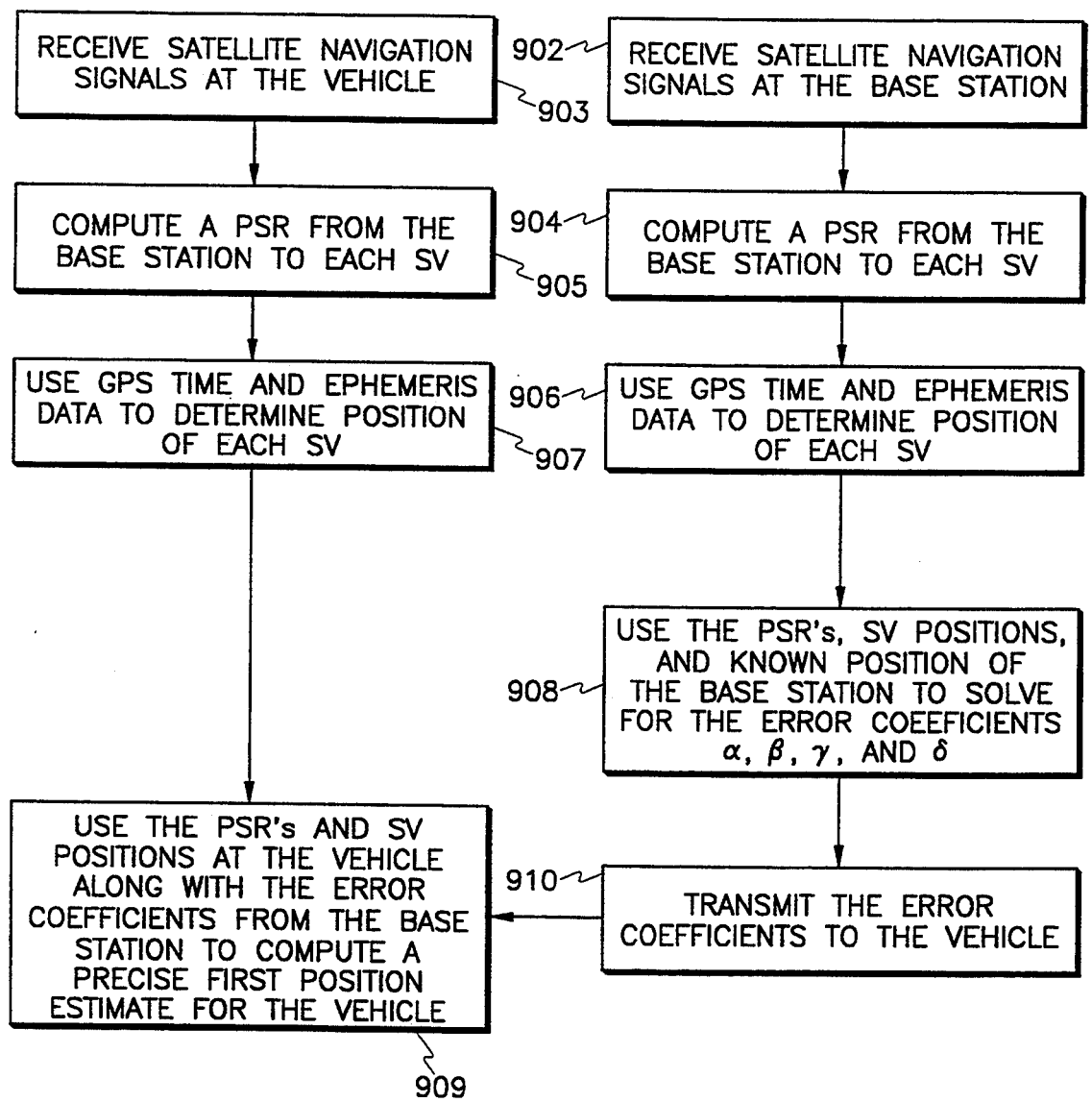
FIG. 9 is a flow chart illustrating a method according to the invention for computing a precise position estimate using a differential GPS system.

This is illustrated in FIG. 9. In a step 902, ephemeris data and range data are received from each satellite 102 at the base station 220. The pseudorange (PSR) to each satellite is determined at step 904. Then, at step 906, the position of each satellite is computed using the ephemeris data and the GPS time. At step 908, the pseudoranges, satellite positions and the known position $(B_x, B_y, B_z)$ of the base station are used to compute values for the clock bias and the error coefficients $\alpha$, $\beta$, $\gamma$ and $\delta$ using the following equations:

$$(x_1-\alpha B_x)^2+(y_1-\beta B_y)^2+(z_1-\gamma B_z)^2=(\delta PSR_1-B_{clock})^2 \quad \text{EQ.38}$$

$$(x_2-\alpha B_x)^2+(y_2-\beta B_y)^2+(z_2-\gamma B_z)^2=(\delta PSR_2-B_{clock})^2 \quad \text{EQ.39}$$

$$(x_3-\alpha B_x)^2+(y_3-\beta B_y)^2+(z_3-\gamma B_z)^2=(\delta PSR_3-B_{clock})^2 \quad \text{EQ.40}$$

$$(x_4-\alpha B_x)^2+(y_4-\beta B_y)^2+(z_4-\gamma B_z)^2=(\delta PSR_4-B_{clock})^2 \quad \text{EQ.41}$$

$$(x_5-\alpha B_x)^2+(y_5-\beta B_y)^2+(z_5-\gamma B_z)^2=(\delta PSR_5-B_{clock})^2 \quad \text{EQ.42}$$

Since the clock bias must be accounted for in the equations, five satellites are required to solve for the error coefficients.

Once values for the error coefficients have been computed, the error coefficients are transmitted to the vehicle, in a step 910, over communication channel 225.

Simultaneously with execution of steps 902,904,906 at base station 220, corresponding steps 903,905,907 are performed at vehicle 210. Only four of the five satellites need be used at the vehicle. However, all five satellites may be used for better accuracy. Upon receipt of the error coefficients from the base station, the vehicle can compute a precise position estimate at a step 909 (e.g., using Equations 30-33 set forth above).

As with the other embodiments described herein, if precision clocks are used, then the clock biases may be removed from the computations and only four satellites are required to accurately compute a vehicle position using a differential GPS system.

The invention may also be used as a method for measuring the accuracy of computed position estimates. That is, if a calculated vehicle position is accurate, then the $\alpha$, $\beta$, $\gamma$ and $\delta$ coefficients will approach one (i.e., the $\epsilon_x$, $\epsilon_y$, $\epsilon_z$ and $\epsilon_P$ coefficients will each be very near zero). Any deviation from unity represents an error from the precise position.

Yet another application for the invention is to select the optimal satellites in a constellation for use in computing a PE. For example, if eight satellites are present in a constellation, then seventy possible combinations of four satellites are available for use in the PE computations. The $\alpha$, $\beta$, $\gamma$ and $\delta$ coefficients may be computed for each possible combination to determine which combination produces the smallest position error (i.e., coefficients nearest to unity).

Still another application for the invention is closely related to that discussed immediately above. Using each of the permutations of possible satellite combinations, an average value for each error coefficient may be computed. These average values may then be used in the computation of a vehicle position.

While the invention has been particularly shown and described with reference to several preferred embodiments thereof, it will be understood by those skilled in the art that various changes in form and details may be made therein without departing from the spirit and scope of the invention as defined in the appended claims.

I claim:

1. A method for determining the position of a first receiver at or near the surface of the Earth using a second receiver having a known position and using a satellite-based navigation system having a constellation of navigation satellites, the method comprising the steps of:

(a) receiving, from the constellation of navigation satellites, a first plurality of navigation signals at the first receiver;

(b) receiving, from the constellation of navigation satellites, a second plurality of navigation signals at the second receiver;

(c) computing a first error coefficient representing an error in an x direction from said second plurality of navigation signals and the known position of the second receiver, said first error coefficient representing an average error in the x direction for the constellation of navigation satellites;

(d) computing a second error coefficient representing an error in a y direction for the position of the second receiver from said second plurality of navigation signals and the known position of the second receiver, said second error coefficient representing an average error in the y direction for the constallation of navigation satellites;

(e) computing a third error coefficient representing an error in a z direction for the position of the second receiver from said second plurality of navigation signals and the known position of the second receiver, said third error coefficient representing an average error in the z direction for the constellation of navigation satellites;

(f) computing a fourth error coefficient representing a mean pseudorange error from said second plurality of navigation signals and the known position of the second receiver; and (g) determining a precise position of the first receiver using said first plurality of navigation signals and said error coefficients.

2. The method of claim 1, wherein said steps (c), (d), (e) and (f) of computing are performed at the second receiver and said step (g) of computing is performed at the first receiver, said method further comprising the step between steps (f) and (g) of:

(h) transmitting said error coefficients from the second receiver to the first receiver.

3. The method of claim 2, wherein the constellation of navigation satellites includes four satellites.

4. The method of claim 1, wherein said steps (c), (d), (e), (f) and (g) of computing are performed at the first receiver, said method further comprising the steps between steps (b) and (c) of:

(h) computing, at the second receiver, a satellite position and a pseudorange for each satellite from said second plurality of navigation signals; and (i) transmitting said satellite positions and said pseudoranges to the first receiver.

5. The method of claim 4, wherein the constellation of navigation satellites includes four satellites.

6. A method for computing the position of a receiver at or near the surface of the Earth using a satellite-based navigation system having a constellation of navigation satellites, the method comprising the steps of:
   (a) selecting a first plurality of satellites from the constellation;
   (b) computing, for each satellite in said first plurality of satellites, a first satellite position and a first pseudorange;
   (c) computing a position estimate for the receiver from said first satellite positions and said first pseudoranges;
   (d) selecting a second plurality of satellites from the constellation;
   (e) computing, for each satellite in said second plurality of satellites, a second satellite position and a second pseudorange;
   (f) computing, from said second pseudoranges, second satellite positions and said position estimate, a first error coefficient characterizing position error trends in an x direction of said position estimate, a second error coefficient characterizing position error trends in a y direction of said position estimate, a third error coefficient characterizing position error trends in a z direction of said position estimate, and a fourth error coefficient characterizing error trends in said second pseudoranges; and
   (g) using said error coefficients to refine said position estimate for the receiver to produce a refined position estimate.

7. The method of claim 6, wherein said first plurality of satellites comprises first, second, third and fourth satellites and said second plurality of satellites comprises third, fourth, fifth and sixth satellites.

8. The method of claim 6, further comprising the steps of:
   (i) computing a difference between said position estimate and said refined position estimate;
   (j) comparing said difference to a predetermined threshold; and
   (k) if said difference is greater than said predetermined threshold, substituting said refined position estimate for said position estimate and repeating steps (d)–(k).

9. A method for computing a position estimate for a receiver located at or near the surface of the Earth using a satellite-based navigation system having a constellation of navigation satellites, the method comprising the steps of:
   (a) receiving, from each of at least four satellites, a first navigation signal at the receiver;
   (b) computing, from said first navigation signals, a first pseudorange and a first satellite position for each of said at least four satellites;
   (c) moving the receiver from a first position to a second position, wherein said second position is related to said first position by a velocity of the vehicle and a travel time between said first and second positions;
   (d) receiving, from each of said at least four satellites, a second navigation signal at the receiver located at said second position;
   (e) computing, from said second navigation signals, a second pseudorange and a second satellite position for each of said at least four satellites;
   (f) selecting one of said first and second positions for computation of a receiver position estimate;
   (g) computing a first error coefficient representing an error in an x direction for said receiver position estimate from said first and second pseudoranges, said first and second satellite positions, said vehicle velocity and said travel time;
   (h) computing a second error coefficient representing an error in a y direction for said receiver position estimate from said first and second pseudoranges, said first and second satellite positions, said vehicle velocity and said travel time;
   (i) computing a third error coefficient representing an error in a z direction for said receiver position estimate from said first and second pseudoranges, said first and second satellite positions, said vehicle velocity and said travel time; and
   (j) computing a precise receiver position estimate for said selected position of the receiver using said first pseudoranges, said first satellite positions and said error coefficients.

10. The method of claim 9, further comprising the step before step (j) of:
   (k) computing a fourth error coefficient representing a mean error in said first and second pseudoranges from said first and second pseudoranges, said first and second satellite positions, said vehicle velocity and said travel time.

11. An apparatus for determining the position of a vehicle at or near the surface of the Earth using signals from a satellite-based navigation system having a constellation of navigation satellites, comprising:
   (a) a first receiver mounted on said vehicle to receive a first plurality of navigation signals from the constellation of navigation satellites;
   (b) a second receiver located at a known position to receive a second plurality of navigation signals from the constellation of navigation satellites;
   (c) first means, electrically connected to said second receiver, for computing, based on said second plurality of navigation signals and said known position, a first error coefficient representing an average error in an x direction for the constellation of navigation satellites, a second error coefficient representing an average error in a y direction for the constellation of navigation satellites, a third error coefficient representing an average error in a z direction for the constellation of navigation satellites, and a fourth error coefficient representing a mean pseudorange error for the constellation of navigation satellites; and
   (d) second means, electrically connected to said first receiver, for receiving said error coefficients from said first means and for computing an accurate vehicle position based on said first plurality of navigation signals and said error coefficients.

12. An apparatus for determining a position of a vehicle at or near the surface of the Earth using navigation signals from a satellite-based navigation system having a constellation of navigation satellites, comprising:
   (a) a receiver mounted on the vehicle to receive, from each of at least four satellites, a first navigation signal at a first position of said vehicle and a second navigation signal at a second position of said vehicle;
   (b) means for determining, from said first navigation signals, a first pseudorange and a first satellite position for each of said at least four satellites and for determining, from said second navigation signals, a second pseudorange and a second satellite position for each of said at least four satellites;

(c) means for determining a velocity and a travel time of said vehicle as it is moved from said first position to said second position; and (d) means for computing, from said first and second pseudoranges, said first and second satellite positions, said vehicle velocity and said travel time, a vehicle position estimate, a first error coefficient representing an error in an x direction of said vehicle position estimate, a second error coefficient representing an error in a y direction of said vehicle position estimate, a third error coefficient representing an error in a z direction of said vehicle position estimate and a fourth error coefficient representing a mean error in said first and second pseudoranges, wherein said error coefficients account for errors to enhance the accuracy of said vehicle position estimate.

* * * * *